Sept. 13, 1966 R. I. WORLEY ETAL 3,272,925

CODED DISK REPERTORY TELEPHONE DIALER

Filed June 11, 1962 3 Sheets-Sheet 1

INVENTORS.
Robert I. Worley
BY Gaston K. Worley

Hovey, Schmidt, Johnson & Hovey.
ATTORNEYS.

CODED DISK REPERTORY TELEPHONE DIALER

Filed June 11, 1962 3 Sheets-Sheet 2

INVENTORS.
Robert I. Worley
BY Gaston K. Worley

Hovey, Schmidt, Johnson & Hovey.
ATTORNEYS.

CODED DISK REPERTORY TELEPHONE DIALER

Filed June 11, 1962 3 Sheets-Sheet 3

INVENTORS.
Robert I. Worley
BY Gaston K. Worley
Hovey, Schmidt, Johnson & Hovey
ATTORNEYS.

3,272,925

CODED DISK REPERTORY TELEPHONE DIALER

Robert I. Worley, 4011 Sinclair, and Gaston K. Worley, 511 Bowser, both of Austin, Tex.

Filed June 11, 1962, Ser. No. 201,522
4 Claims. (Cl. 179—90)

This invention relates to automatic dial and alarm systems and, more specifically, to a system whereby a preselected telephone number may be dialed by pressing a single button and to an alarm system integrated therewith so that a preselected telephone number may be dialed upon the happening of a predetermined event.

There have been numerous devices developed prior to this invention in an effort to provide a means whereby the usual manipulation may be avoided in dialing a telephone. One problem with many of these devices is that they must be interconnected internally with the telephone instrument. This, of course, does not give the telephone subscriber absolute freedom in connecting such a device, as it is often not feasible to break into the internal mechanism of a telephone instrument for various reasons.

Another problem with the devices of the prior art is that often such devices are designed with a large capacity of preset telephone numbers as a primary object. This greatly reduces the utility of an automatic dialing device because many subscribers only dial frequently a relatively small number of telephone numbers. Therefore, in order for the subscriber to exploit the advantages of owning such a device, an expenditure must be made for equipment of a greater complexity than actually needed.

In connection with automatic telephone dialers, it would often be advantageous to provide in conjunction therewith some type of alarm system for use, as a common example, between office and home. For instance, quite often equipment failures or a hazard such as fire cause great financial loss but could be prevented if the presence of the failure or other hazard had been known by the proper party in time for corrective action to have been taken. Thus in the present invention an alarm system is also contemplated to supplement existing alarm systems without the use of special telephone lines or to provide an independent alarm system.

It is, therefore, an object of this invention to provide an automatic dial and alarm system for use in conjunction with existing telephone equipment and telephone lines.

It is another object of this invention to provide an automatic dialing system whereby preselected telephone numbers may be automatically dialed by the telephone subscriber and, in conjunction therewith, an alarm system responsive to a predetermined event for dialing one of said preselected telephone numbers.

It is still another object of this invention to provide apparatus that may be conveniently employed to automatically dial a selected group of frequently used telephone numbers by the simple depressing of a single button.

It is still another object of this invention to provide an automatic telephone dialing apparatus entirely independent of the internal mechanism of a telephone instrument and operable by depressing a single button corresponding to a certain preselected telephone number.

Figure 5:
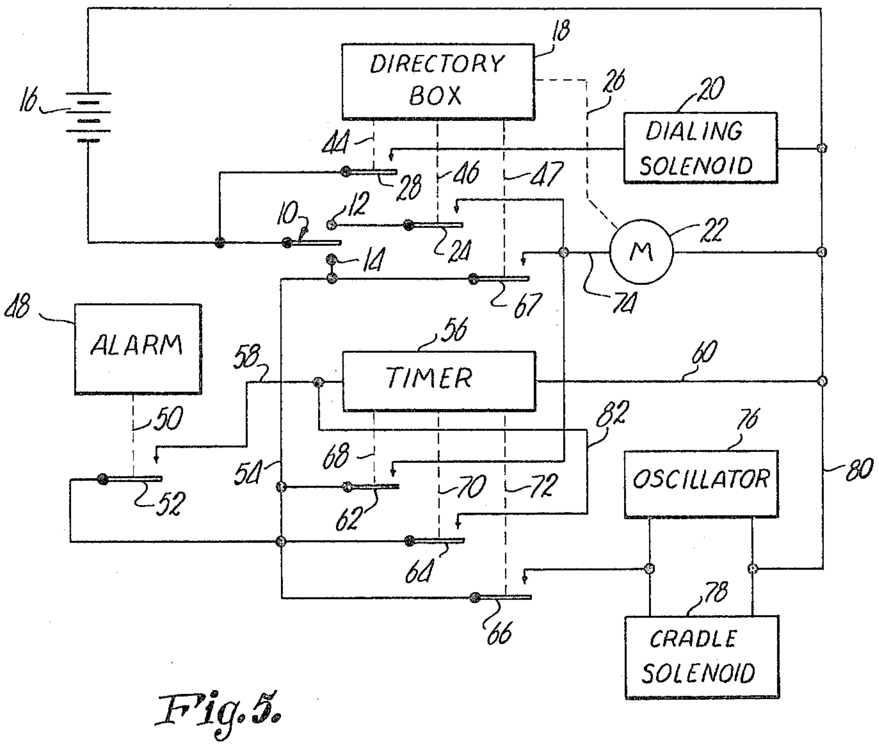
FIG. 5 is a schematic diagram of the automatic dial and alarm system connected externally of the telephone instrument.

Referring first to FIG. 5, the system is shown for connection externally of the telephone instrument wherein a single-pole, double-throw switch 10 is utilized to select either the automatic dialing system itself or the combination automatic dial and alarm system. The dialing system itself is in operation when switch 10 is thrown to connect with contact 12, the combination dial and alarm system being selected when the switch 10 is thrown to connect with contact 14. A power source 16 is common to both systems along with the directory box 18, dialing solenoid 20 and motor 22.

When switch 10 is thrown to make the electric circuit from power source 16 through contact 12, the automatic dialing system is ready for operation. When it is desired to dial a preselected telephone number, normally open contact 24 is closed by the depressing of a single button within directory box 18 corresponding to said telephone number. The structural details of directory box 18 will be fully discussed hereinafter. The closing of contact 24 places motor 22 across the power circuit and drives the internal mechanical components of directory box 18 by mechanical linkage means 26. Directory box 18 then automatically closes and opens the normally open dialing contact 28 to thereby pulse the dialing solenoid 20 by automatically connecting and disconnecting solenoid 20 from the power circuit. Dialing solenoid 20 is positioned on the telephone instrument so that the pulsing armature thereof engages the hang-up button and depresses it in accordance with the pulse commands from dialing contact 28. It is well known to those familiar with the art that a telephone may be dialed by rapidly reciprocating the hang-up button. Thus the telephone instrument is automatically dialed by means entirely external of the instrument itself.

Figure 6:
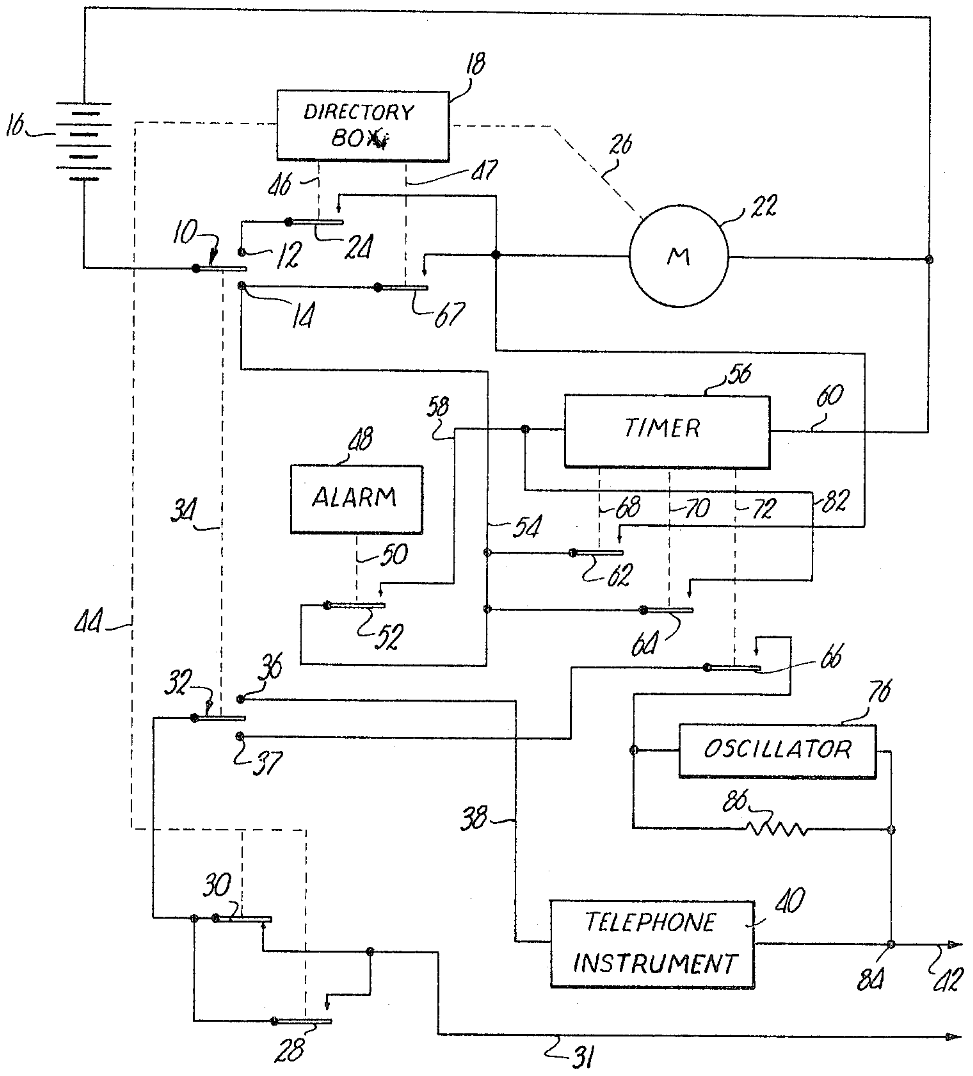
FIG. 6 is a schematic diagram of the automatic dial and alarm system connected internally with the telephone instrument.
Figure 7:
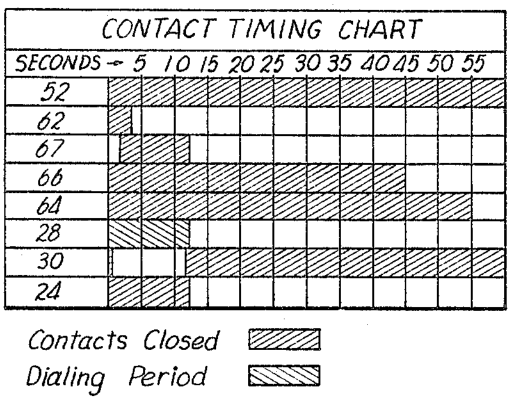
FIG. 7 is a contact timing chart illustrating the operation of the contacts shown in FIGS. 5 and 6.

Referring to FIG. 6, a similar arrangement may be seen for connecting an automatic dial and alarm system internally with the telephone instrument. Like components are designated by like reference characters. When normally open contact 24 is closed, as by pressing a single button in directory box 18 corresponding to a preselected telephone number, motor 22 is energized and drives directory box 18 by mechanical linkage means 26. In this arrangement, however, as may be seen by the contact timing chart in FIG. 7, a normally closed line retainer contact 30 must be opened before dialing contact 28 can function. Note that in FIG. 6 dialing contact 28 is shown as normally open; however, during the dialing period, contact 28 is actually in a closed position except when being pulsed by directory box 18. The reason for this arrangement will become apparent when the mechanical features of directory box 18 are discussed in detail later in the specification. Note that the line retainer contact 30 slightly overlaps the 12-second dialing period illustrated in the contact timing chart. It will be understood that a closed circuit must be maintained along telephone line 31 except when the "breaking" impulses from directory box 18 are interposed on line 31 to effect dialing. The dialing circuit is completed by means of another SPDT switch 32 ganged to switch 10 as by mechanical linkage means 34. When switch 10 is thrown to connect with contact 12, switch 32 is likewise thrown to connect with its corresponding contact 36, thus completing the electrical circuit along lead 38 through telephone instrument 40 to the other telephone line 42. In practice, switches 10 and 32 may be one double-pole, double-throw switch, but for purposes of illustration the switches are separated. Furthermore, it should be understood that the dashed lines 44, 46 and 47 emanating from directory box 18 in FIGS. 5 and 6 illustrate mechanical linkage to the corresponding contacts for the operation thereof.

For the combination automatic dialing and alarm system reference is now made to FIG. 5 where switch 10 will be assumed in its other position wherein electrical contact is made through switch 10 to contact 14. In this position the system remains dormant until some predetermined event occurs. The possible happening of such an event is illustrated by an alarm mechanism 48 operable through linkage means 50 to close the normally open alarm contact 52 upon the happening of said predetermined event. If the power circuit from power source 16 is traced through switch 10 and lead 54, it may be seen that the closing of contact 52 places timer 56 across the power circuit through leads 58 and 60. Timer 56 may be a variety of conventional time-responsive switching means operable according to a predetermined logic sequence. More specifically, timer 56 could take the form of a slow speed synchronous motor driving a shaft having camming surfaces thereon adapted to engage pressure-sensitive switches according to a predetermined time sequence set into the device by the particular cam configurations.

When the timer 56 is energized by the closing of contact 52, the normally open contacts 62, 64 and 66 are closed by the actuation of the corresponding linkage means 68, 70 and 72. The closing of contact 62 places motor 22 across the power circuit by interconnecting lead 74 with lead 54 and hence switch 10 and power source 16. As may be seen from FIG. 7, contact 62 is only closed for approximately 3 seconds. After the 3-second duration the motor 22 through linkage means 26 with directory box 18 closes normally open contact 67, thus shifting the control of the motor to directory box 18. Actually, contacts 62 and 67 are overlapped to insure positive operation, the contact 67 opening to cease motor operation at the close of the 12-second dialing period.

Meanwhile, contact 66 has placed audio oscillator 76 and cradle solenoid 78 across the power circuit through leads 54 and 80. The function of cradle solenoid 78 is to lift the telephone handset clear of the hang-up button to place the telephone instrument in operation. Simultaneously, audio oscillator 76 generates an audio tone through a speaker (not shown) placed in close proximity to the telephone handset. The motor 22 driving the dialing mechanism of directory box 18 causes the pulsing of the dialing contact 28, thus automatically energizing and deenergizing dialing solenoid 20. Thus the solenoid 20 is pulsed to dial a preselected telephone number and an audio tone is placed on the telephone line through the cooperative operation of oscillator 76 and cradle solenoid 78. The audio signal lasts for 45 seconds, at which time the oscillator 76 and solenoid 78 are deenergized by the opening of contact 66. This is illustrated on the contact timing chart.

It may be seen from the timing chart that the contact 64 remains closed after the opening of contact 66 until a later time, approximately 55 seconds after the commencing of the cycle. Contact 64 through lead 82 serves to maintain timer 56 across the power circuit through leads 54 and 60, even though the alarm contact 52 may open some time during the cycle. This is to illustrate that timer 56 must be reset by some means so that at a later time the closing of contact 52 will cause the dialing sequence to be initiated at the proper starting point in time. Thus contact 64 holds timer 56 in the power circuit until approximately the end of the cycle. It will be appreciated that if the alarm contact 52 remains closed, the cycle will be repeated while such alarm condition exists.

Referring now to FIG. 6, a similar arrangement is shown for connecting the alarm system internally with the telephone instrument. The throwing of switches 10 and 32 to connect with their respective contacts 14 and 37 places the system in readiness to receive an alarm command. Similar to that above described for FIG. 5, the closing of contact 52 places timer 56 in the power circuit. The closing of contact 62 places motor 22 in the power circuit and contact 67 retains the motor therein during the 12-second dialing period. As aforesaid, contact 64 holds the timer 56 in operation until the end of the cycle, notwithstanding the subsequent opening of contact 52.

Differences in the circuitry of FIG. 6 as compared with that of FIG. 5, of course, exist in the pulse interruption of the telephone line and the means by which the signal from oscillator 76 is superimposed on the telephone line. In FIG. 6 the oscillator 76 is shown series connected in telephone line 42 between junction point 84 and the contact 66. Oscillator 76 may be a transistor oscillator powered by the D.C. voltage on the telephone line; therefore, no external power source is necessary. A line resistor 86 is connected across the oscillator 76 to facilitate the interconnection with telephone line 42. The closing of contact 66 by timer 56 thus provides a closed circuit from telephone line 42 through oscillator 76 to telephone line 31.

It may be seen that in FIG. 6 the telephone instrument is effectively by-passed by the throwing of switch 32 to contact 37. The oscillator 76 is coupled directly with the telephone lines and operates for 45 seconds, at which time the oscillator is disconnected and the telephone line is opened by the opening of contact 66.

Figure 1:
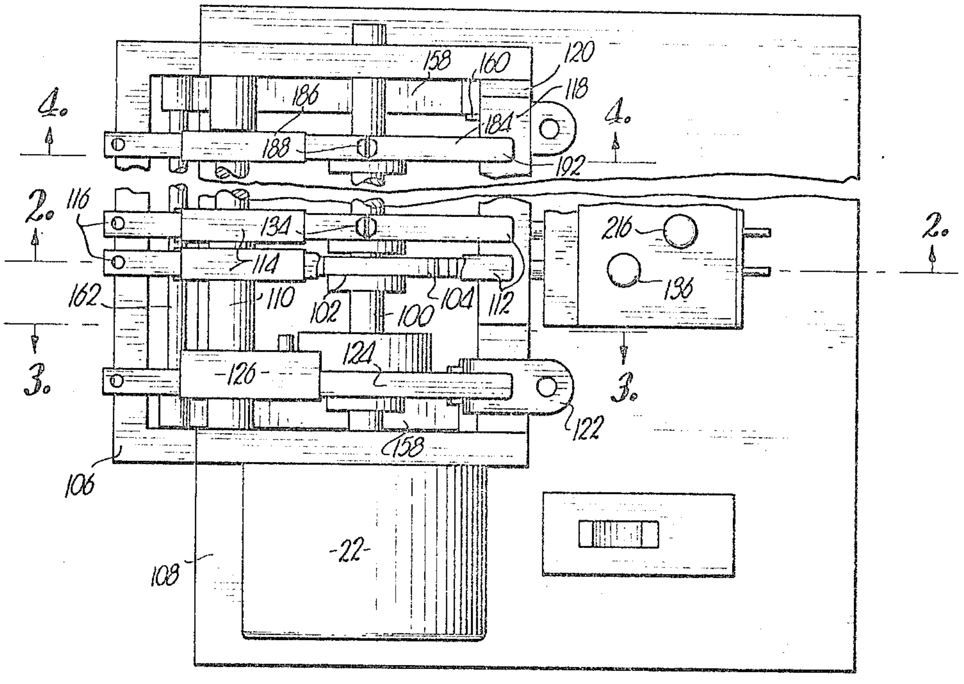
FIGURE 1 is a plan view of the automatic dialing apparatus of the present invention.
Figure 2:
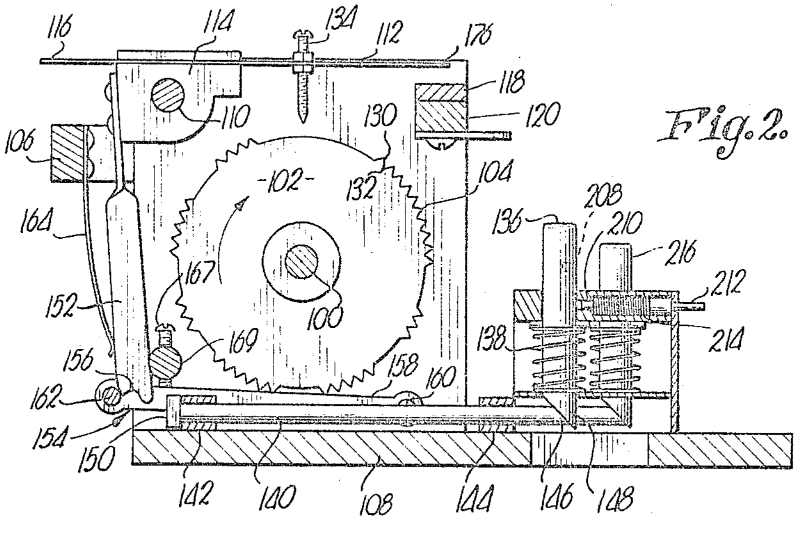
FIG. 2 is a vertical section along line 2—2 in FIG. 1.

Reference is now made to FIGS. 1 through 4 where the novel mechanical features of the directory box 18 and its coordinated components are shown. The components shown in the electrical schematics (FIGS. 5 and 6) that are associated with directory box 18 and are shown in FIGS. 1 through 4 include motor 22, contacts 24, 28, 30 and 67, and the respective linkages to said contacts designated 46, 44 and 47. Referring specifically to FIGS. 1 and 2, the motor 22 is shown coupled to a shaft 100 which drives a plurality of circular cams 102. Each of the cams 102 has camming surfaces 104 thereon corresponding to a preselected telephone number. Camming surfaces 104 will be discussed in detail hereinafter.

The mechanical apparatus is mounted on a frame 106 which is attached to a base plate 108. Supported between the vertical sides of frame 106 is a shaft 110 fixed to said frame. A plurality of cam follower arms 112 are pivotally mounted on shaft 110 by means of insulated bushings 114. One cam follower arm 112 and insulated bushing 114 are provided for each cam 102. The cam follower arms are composed of an electrically conducting metal and are operable to complete an electrical circuit between one end 116 of said arms and a contact bar 118. Contact bar 118 is mounted between the vertical sides of frame 106 on an insulated bar 120. Another contact 122 is mounted on insulated bar 120 to mate with an additional contact arm 124 pivotally mounted on shaft 110 by insulated bushing 126. A switch 128 is shown mounted to base plate 108, said switch corresponding to switches 10 and 32 previously discussed with reference to the electrical schematics in FIGS. 5 and 6.

The cams 102 have camming surfaces 104 thereon corresponding to preselected telephone numbers. These telephone numbers are commonly the most frequently called numbers of a particular subscriber. It may be noted in FIG. 2 that the camming surfaces 104 comprise a series of raised portions 130 and depressions 132. Portions 130 and 132 are engageable with the corresponding cam follower arm 112 to produce interruptions in the electrical circuit between the end 116 and contact bar 118. Camming surfaces 104 engage an arm 112 through contact with an adjustable protruding member 134, such as a machine screw, attached to the arm 112.

More specifically, the depressing of push-button 136 moves the button downwardly against the action of spring 138, causing actuating rod 140 to move leftwardly, as seen in FIG. 2. Actuating rod 140 is mounted to base plate 108 by means of bushings 142 and 144. Leftward motion is achieved by the mating of the biased end 146 of rod 140 with the corresponding biased end 148 of push-button 136.

The motion of actuating rod 140 by depressing push-button 136 moves end surface 150 of rod 140 in engagement with a lever 152 attached to insulated bushing 114 of follower arm 112. This causes follower arm 112 to pivot about shaft 110 in a clockwise direction, thus subjecting protruding member 134 to engagement with the camming surfaces 104. A locking device 154 engages a notch 156 in lever 152 to maintain the lever and the arm in the actuated position upon the release of push-button 136.

Figure 3:
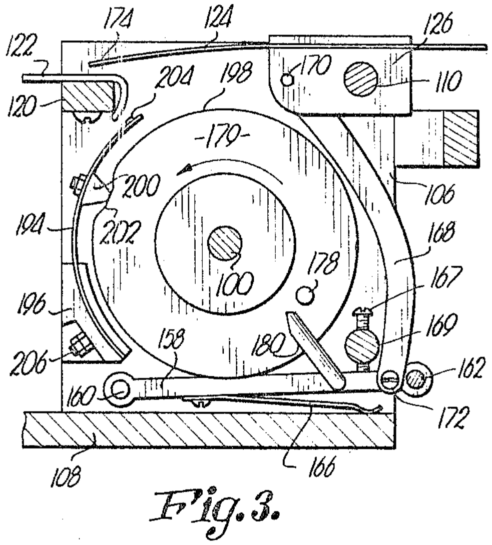
FIG. 3 is a vertical section along line 3—3 in FIG. 1.
Figure 4:
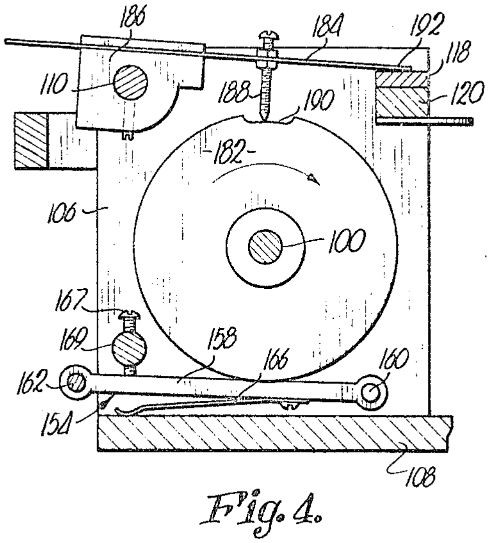
FIG. 4 is a vertical section along line 4—4 in FIG. 1.

Referring especially to FIGS. 3 and 4, locking device 154 comprises a pair of pivot arms 158 mounted on their corresponding pivot studs 160 which protrude horizontally from frame 106. It may be seen in FIG. 2 that at the other ends of pivot arms 158 a locking rod 162 engages notch 156 and holds the lever 152 in the actuated position against the bias of spring 164. Locking rod 162 is maintained in notch 156 by the action of springs 166 bearing against the undersurfaces of pivot arms 158. Pivot arms 158 are biased upwardly by springs 166 so that solid engagement is maintained between rod 162 and notch 156. Adjustable screws 167 threaded perpendicularly through shaft 169 mounted to frame 106 bear against the upper surfaces of pivot arms 158 to limit the travel of said arms under the bias of springs 166.

Referring now to FIG. 3, a curved member 168 is shown attached to insulated bushing 126 of contact arm 124. Downward movement of locking rod 162 (clockwise rotation of pivot arm 158 as viewed in FIG. 3) causes curved member 168 to move downwardly on its pivots 170 and 172 to engage the tip 174 of arm 124 with contact 122. Thus the total effect of depressing push-button 136 is to close an electrical circuit between contact arm 124 and contact 122 and simultaneously to engage the protruding member 134 of arm 112 with the camming surface 104. Such engagement places the tip 176 of arm 112 in engagement with contact bar 118, thus closing the electrical circuit from the end 116 of arm 112 to contact bar 118. The closing of the circuit through contact 122 corresponds to the closing of contact 24 in FIGS. 5 and 6 and thus actuates motor 22. The closing of the electrical circuit through contact bar 118 corresponds to the action of the dialing contact 28 in FIGS. 5 and 6.

While the electric circuits, through contacts 122 and 118, are maintained as above described, the rotation of shaft 100 causes the camming surfaces 104 of a preselected cam 102 to alternately "make" and "break" the circuit through contact 118 by alternately engaging and disengaging member 134. The camming surface 104 illustrated shows 7 sets of raised and depressed portions 130 and 132. These 7 sets correspond to the 7 digits of the preselected telephone number. Taking the position of cam 102 as shown as the initial position at the beginning of the dialing period, the number dialed would correspond to the digits 453–6530. Thus as member 134 rides over camming surfaces 104 the electrical circuit through contact 118 will be broken in rapid succession in correspondence with the aforesaid digits. It is contemplated that a 5 r.p.m. motor 22 will be utilized to drive shaft 100; therefore, it may be seen that the dialing period is 12 seconds in duration.

In FIG. 3 is can be seen that at the beginning of the dialing period a trip stud 178 extending from a cam 179 is out of engagement with a trip arm 180 attached to pivot arm 158. However, at the end of one revolution of shaft 100 trip stud 178 contacts trip arm 180, forcing pivot arm 158 downwardly. This downward motion of pivot arm 158 forces the locking rod 162 out of engagement with notch 156 in lever 152 and allows the lever and its associated arm 112 to return to its original position under the tension of spring 164. This breaks the electrical circuit through contact 112 and contact 118, thus breaking the power circuit to motor 22 and disengaging the dialing contacts. The inertia of shaft 100 due to the presence of the cams thereon causes cam 179 to rotate slightly past the trip point, thus returning trip stud 178 to its initial position as shown.

Reference is now made to FIG. 4 where a cam 182 is shown mounted on shaft 100. A contact arm 184 is rigidly mounted to shaft 110 by insulated bushing 186. A protruding screw 188 is received by a depression 190 in the surface of cam 182. Contact arm 184 is of spring steel or similar material so that contact is maintained with contact bar 118 by tip 192 of contact arm 184. It may be seen from the drawing that rotation of cam 182 will force screw 188 and the arm 184 upwardly and out of engagement with contact bar 118. Depression 190 is short in length so that substantially the only time that tip 192 is in contact with contact bar 118 is when cam 182 is in its initial position as shown just prior to rotation.

Contact arm 184 serves as the line retainer contact 30 shown in FIG. 6. The depression 190 is so disposed on cam 182 so that the electric circuit through arm 184 and contact bar 118 is maintained at all times except during the dialing period. Therefore, referring to FIG. 7, it may be seen that the telephone line will be maintained through the telephone instrument or the oscillator output except during the dialing period. The line retainer contact slightly overlaps the dialing period to insure proper line retention. It may be noted that this contact is not needed if the circuit as shown in FIG. 5 is utilized because the line is maintained by the internal mechanism of the telephone instrument as long as the cradle solenoid 78 remains energized.

In regard to the externally connected circuit shown in FIG. 5, it will be understood that in this arrangement a "make" rather than a "break" impulse is needed to facilitate dialing by means of the dialing solenoid 20. Therefore the cams on the automatic dialing mechanism (directory box 18) will be reversed to that as shown so that the circuit through follower arm 112 and contact bar 118 remains open except when member 134 engages a depression in the camming surfaces 104 such as shown at 132.

When the dialing mechanism as above described is used in the alarm circuitry of either FIG. 5 or FIG. 6, an additional feature is added to cam 179. As shown in FIG. 3, a curved contact arm 194 is disposed about cam 179 and maintained in a fixed relationship thereto by an insulated mounting 196 fixed to frame 106. Curved arm 194 is maintained in engagement with the camming surface 198 of cam 179 by an insulator 200 under the pressure of the resiliency of curved arm 194. Prior to energization of motor 22, insulator 200 rides in depression 202 of camming surface 198, thus maintaining tip 204 of curved arm 194 out of engagement with contact 122. When the motor is energized and cam 179 commenced rotation, tip 204 is cammed upwardly into engagement with contact 122.

The purpose of the curved arm 194 and its associated structure is to allow the mechanism to be actuated by an alarm signal and then to provide means whereby the mechanism will sustain itself until the end of the dialing period. Referring to FIGS. 5 and 6, contact 62, responsive to timer 56, initially energized motor 22 upon the closing of alarm contact 52. As may be seen from the contact timing chart, contact 62 only remains closed approximately 3 seconds. This is all that is needed because, prior to the end of this 3-second period, tip 204 will engage contact 122 and maintain the motor 22 in the power circuit. This corresponds to contact 67 shown in FIGS. 5 and 6. It will be understood that appropriate electrical connections will be made to curved arm 194 such as at terminal 206 and to contact 122 in accordance with the electrical schematics of FIGS. 5 and 6. Furthermore, in the light of FIGS. 5 and 6, it is to be understood that wiring connections to the various contacts described in the mechanical dialing mechanism are not shown as such would only serve to confuse the elevational views.

In operating the automatic dialing apparatus in one of the alarm systems of FIGS. 5 and 6, it is necessary to lock the device such that if the alarm condition occurs the preselected telephone number to be called will be dialed by the apparatus. This is conveniently done, as shown in FIG. 2, by placing a groove 208 in push-button 136 (said push-button representing the desired telephone number) so that the button may be maintained in its downward position by inserting the end 210 of rod 212 therein. Rod 212 is normally biased by spring 214 away from groove 208, but when it is desired that push-button 136 be maintained in its downward position, the rod 212 may be pushed against the bias of spring 214 such that end 210 engages groove 208. End 210 is maintained in groove 208 by the frictional forces produced by the upward bias of push-button spring 138. This maintains the end surface 150 of actuating rod 140 in engagement with lever 152 so that the downward motion of locking rod 162 produced by the action of trip stud 178 against trip arm 180 at the end of one revolution does not release lever 152.

The above description has described the operation of a dialing apparatus in its function of providing automatic dialing of a preselected telephone number. However, other preselected telephone numbers may be dialed by cascading as many cams 102 and cam follower arms 112 along shaft 100 as desired. The function of each cam and its associated components is identical to that above described. As shown in FIG. 1, additional units corresponding to preselected telephone numbers would merely be disposed axially of shaft 100 such as illustrated for the additional unit corresponding to push-button 216.

In summary, the automatic dialing and alarm system and the specific automatic dialing apparatus above described presents a novel arrangement for facilitating the automatic dialing of telephones. The dialing apparatus itself possesses a unique feature in that it may be connected internally with the telephone instrument or completely externally thereof. The same is true for the entire system, including the alarm system which may be made responsive to any predetermined event capable of actuating an electrical contact upon the occurrence thereof. Therefore, the cam representing the preselected telephone number and its corresponding cam follower arm are maintained in engagement so that the number will be redialed every 60 seconds until the alarm condition is corrected as illustrated by the contact timing chart of FIG. 7.

Having thus described the invention what is claimed as new and desired to be secured by Letters Patent is:

1. In an automatic telephone dialer:

a frame;

a first shaft rotatably mounted on said frame;

electrical power means coupled with said first shaft for rotating the latter;

a plurality of circular discs having raised and depressed camming surfaces on the circumferential periphery thereof representing a corresponding plurality of preselected telephone numbers, said discs being coaxially mounted on said first shaft and axially spaced therealong;

an electrical contact bar mounted on said frame and insulated therefrom, said bar being substantially parallel to said first shaft and disposed to one side thereof;

a second shaft fixed to said frame substantially parallel to said first shaft and disposed to the other side thereof;

a plurality of electrically conducting arms, each of said arms at one end thereof being pivotally mounted to and insulated from said second shaft, the other end of each arm being engageable with said contact bar, each arm being provided with a protruding member mounted between its ends for engaging the camming surfaces of a corresponding disc;

terminal means electrically interconnecting said arms;

a lever for each of said arms, each lever being fixed to the corresponding arm;

yieldable means in engagement with each of said levers, respectively, and biasing the latter in a direction to normally maintain the protruding members of said arms out of engagement with the camming surfaces of corresponding discs;

push-button actuated means for moving a selected lever against the action of said yieldable means to an actuated position to pivot the corresponding arm about said second shaft and position the protruding member thereof in engagement with the camming surfaces of the corresponding disc;

means releasably locking said selected lever in said actuated position;

electrical energy supply means including switching means coupled with said power means and responsive to movement of the selected lever to said actuated position for energizing said power means, whereby said other end of said pivoted arm alternately engages and disengages said contact bar to alternately close and open the electrical circuit from said contact bar to said terminal means to produce dialing impulses corresponding to the preselected telephone number; and trip means attached to said first shaft for releasing said locking means after one rotation of said first shaft, whereby the dialing apparatus is automatically reset after the preselected telephone number is dialed.

2. In an automatic telephone dialer:

a source of electrical power;

a support;

a shaft rotatably mounted on said support;

electrical power means coupled with said shaft for rotating the latter;

a plurality of dialing cams having raised and depressed camming surfaces thereon representing a corresponding plurality of preselected telephone numbers, said dialing cams being mounted on said shaft for rotation therewith and axially spaced therealong;

electrical contact means mounted on said support;

a plurality of electrically conductive cam followers, each of the latter being shiftably mounted on said support and normally disengaged from the camming surfaces of a corresponding cam, each follower being responsive to its corresponding cam, upon movement into engagement therewith and rotation of said shaft, to alternately engage and disengage said electrical contact means;

terminal means electrically interconnecting said followers;

shiftable means coupled with said followers for moving a selected follower into engagement with the camming surfaces of the corresponding cam upon actuation of said shiftable means;

switch means electrically intercoupling said power source and said power means and normally preventing energization of the latter, said switch means being responsive to said actuation of the shiftable means for effecting energization of said power means to thereby rotate said shaft, whereby the selected follower alternately engages and disengages said contact means during a dialing period to alternately close and open the electric circuit from said contact means to said terminal means to produce dialing impulses corresponding to the preselected telephone number; and reset means rotatable with said shaft and operable to engage said shiftable means at the end of said dialing period to effect return movement of the selected follower to its normal position, whereby to de-energize said power means and thereby maintain the dialer in condition for subsequent actuation of the shiftable means to again dial a preselected telephone number.

3. The invention of claim 2, wherein said shiftable means includes structure for releasably maintaining the selected follower in engagement with the corresponding cam, said reset means being engageable with said structure at the end of said dialing period to actuate the structure and release the selected follower for return movement thereof to its normal position.

4. The invention of claim 3, wherein said shiftable means further includes yieldable means biasing said followers toward their normal positions, said structure being shiftable between a first disposition maintaining the selected follower in engagement with the corresponding cam against the action of said yieldable means and a second disposition permitting return movement of the selected follower by said yieldable means, said reset means shifting said structure to said second disposition at said end of the dialing period.

References Cited by the Examiner

UNITED STATES PATENTS

| | | | |
|---|---|---|---|
| 2,088,002 | 7/1937 | Scott | 179—5 |
| 2,258,266 | 10/1941 | Sengebusch | 179—90.2 |
| 3,095,478 | 6/1963 | Adams | 179—5 |
| 3,125,643 | 3/1964 | Day | 179—90.2 |

DAVID G. REDINBAUGH, *Primary Examiner.*

E. C. MULCAHY, Jr., J. T. STRATMAN, *Assistant Examiners.*